(12) United States Patent
Popps

(10) Patent No.: US 6,511,311 B1
(45) Date of Patent: Jan. 28, 2003

(54) LENS MOLD CARRIERS

(75) Inventor: John Robert Popps, Auburn, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/409,761

(22) Filed: Sep. 30, 1999

Related U.S. Application Data

(60) Provisional application No. 60/160,068, filed on Sep. 30, 1998.

(51) Int. Cl.[7] .............................................. B29C 33/20
(52) U.S. Cl. .................................... 425/451.9; 425/808
(58) Field of Search .......................... 425/450.1, 451.9, 425/453, 454, 808

(56) References Cited

U.S. PATENT DOCUMENTS

| | | | |
|---|---|---|---|
| 3,871,803 A | 3/1975 | Beattie | 425/175 |
| 3,917,077 A | 11/1975 | Tusinski et al. | 214/1 |
| 4,402,659 A | 9/1983 | Greenbaum et al. | 425/233 |
| 4,537,570 A | 8/1985 | Black | 425/450 |
| 4,601,648 A | 7/1986 | Amano et al. | 425/47 |
| 4,629,409 A | 12/1986 | Santon et al. | 425/139 |
| 4,981,634 A | 1/1991 | Maus et al. | 264/102 |
| 5,080,839 A | 1/1992 | Kindt-Larsen | 264/2.6 |
| 5,094,609 A | 3/1992 | Kindt-Larsen | 425/445 |
| 5,141,430 A | 8/1992 | Maus et al. | 425/556 |
| 5,160,668 A | 11/1992 | Imus | 264/1.7 |
| 5,204,127 A | 4/1993 | Prusha | 425/544 |
| 5,375,991 A | 12/1994 | Rydmann | 425/144 |
| 5,762,081 A | 6/1998 | Keene et al. | 134/59 |
| 5,914,074 A * | 6/1999 | Martin et al. | 425/808 |
| 5,916,494 A * | 6/1999 | Widman et al. | 425/808 |
| 5,965,172 A * | 10/1999 | Wang et al. | 425/808 |

FOREIGN PATENT DOCUMENTS

| | | |
|---|---|---|
| EP | 0750982 | 1/1997 |
| GB | 2021474 | 12/1979 |
| WO | WO 90 05061 | 5/1990 |
| WO | WO 98 42497 A | 10/1998 |

* cited by examiner

Primary Examiner—James P. Mackey
(74) Attorney, Agent, or Firm—R. Scott Meece; Jian S. Zhou; Richard I. Gearhart

(57) ABSTRACT

The present invention describes a carrier set for carrying ophthalmic lens molds. The carrier set has a front curve carrier, a back curve carrier, at least one spring in the front curve carrier or the back curve carrier, at least one stabilizing hole formed in one of the front curve and back curve carriers, at least one elongated stabilizing member attached to the carrier that does not have the stabilizing hole, and at least one locking bar in the carrier that has the stabilizing hole.

17 Claims, 17 Drawing Sheets

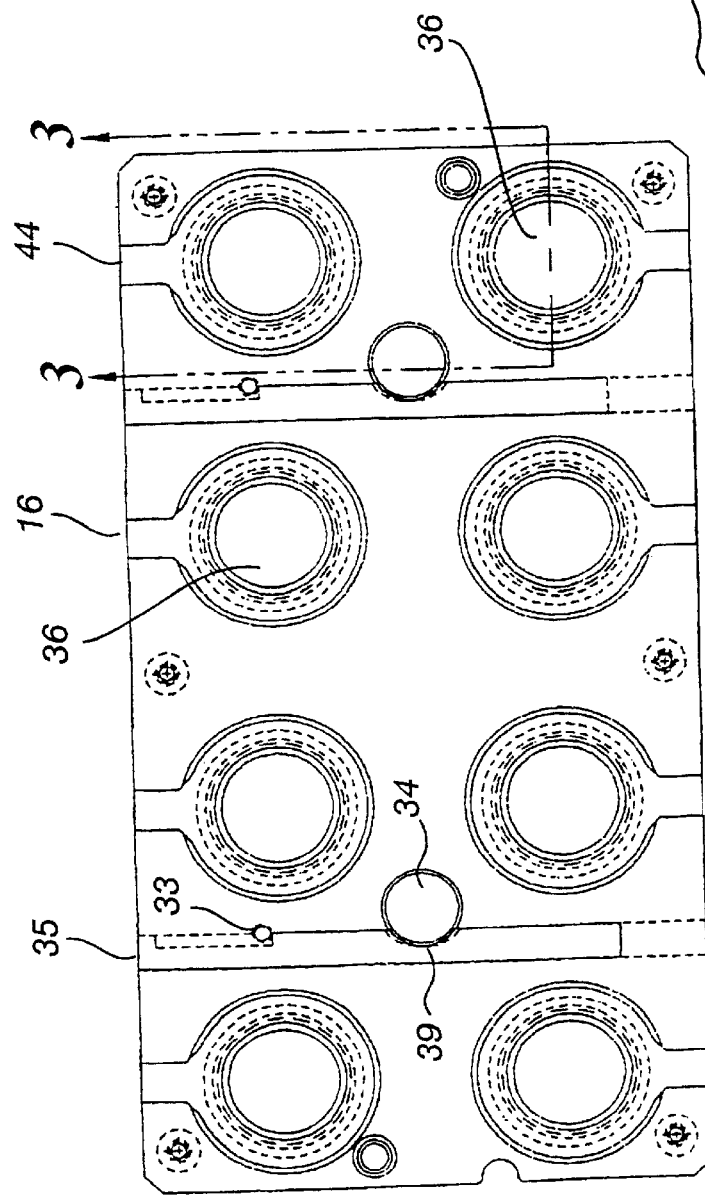

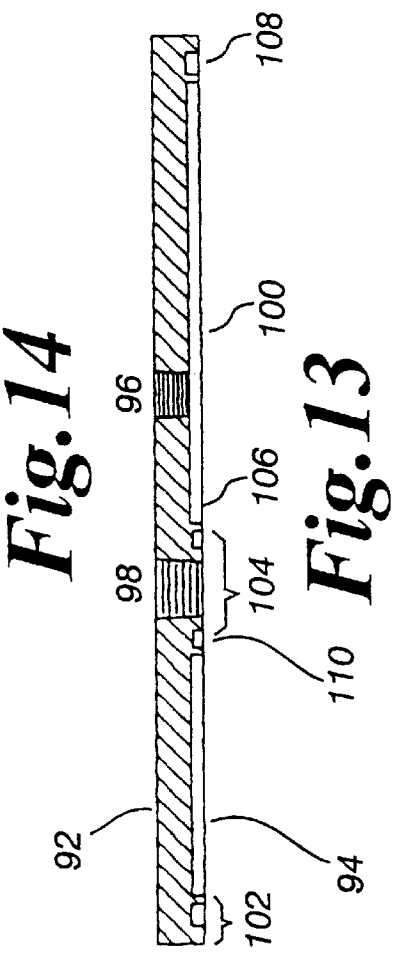
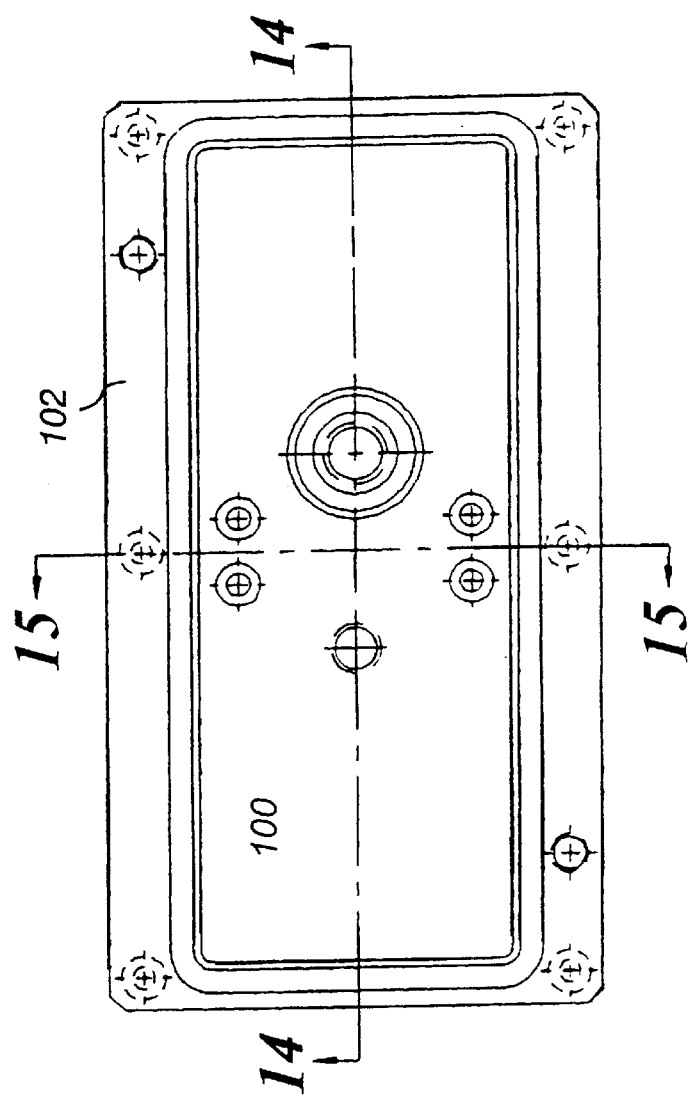
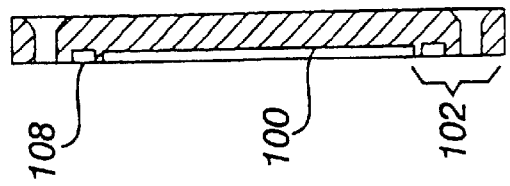

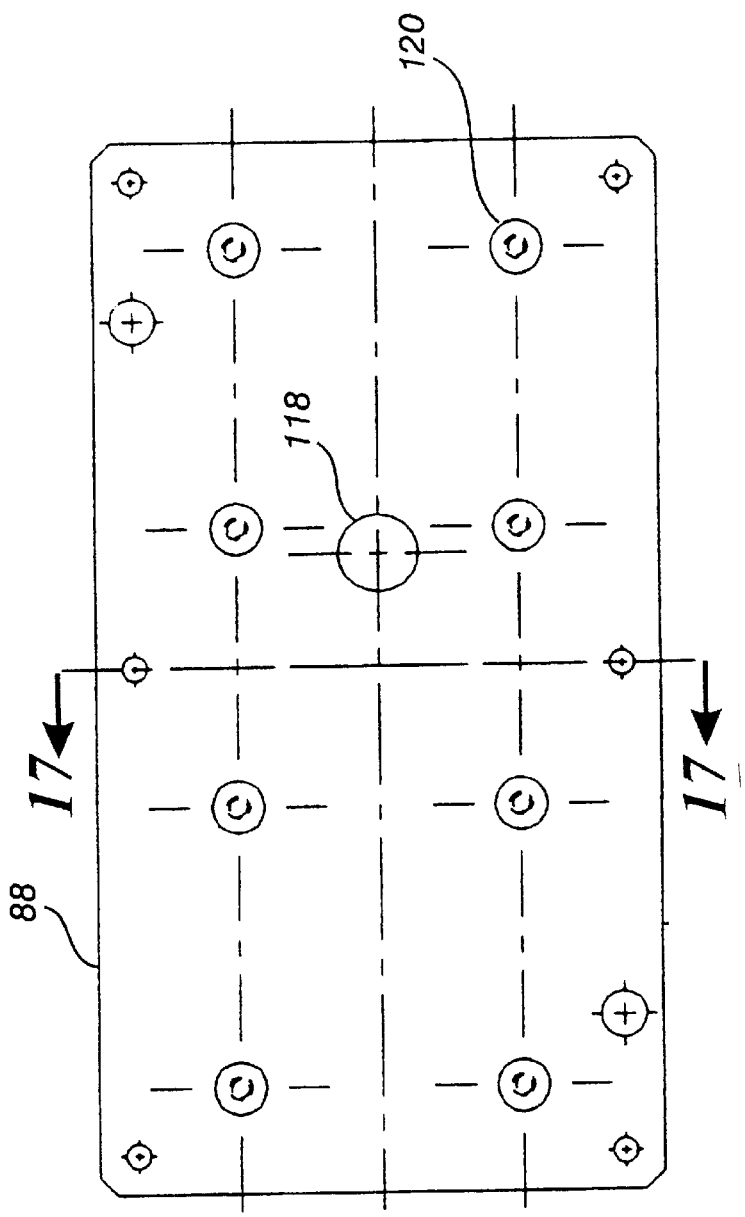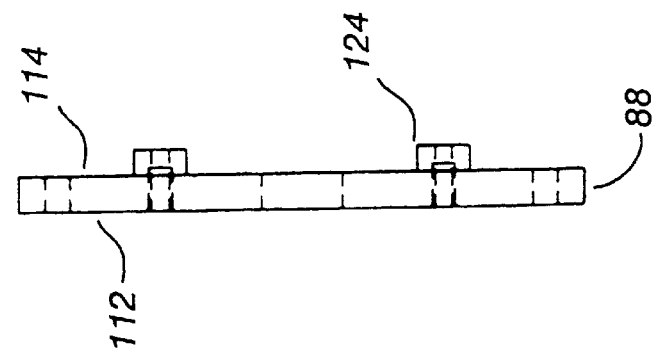

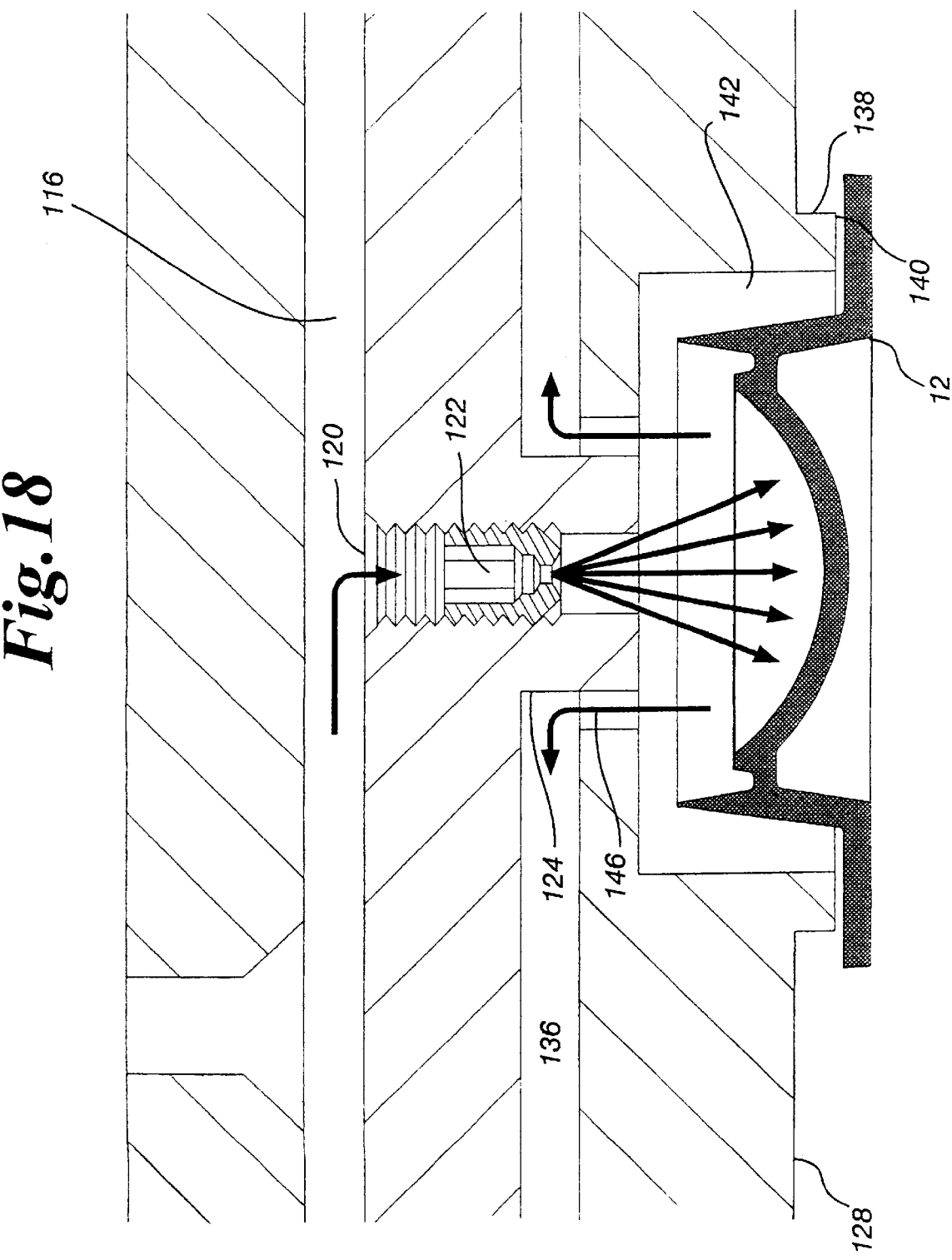

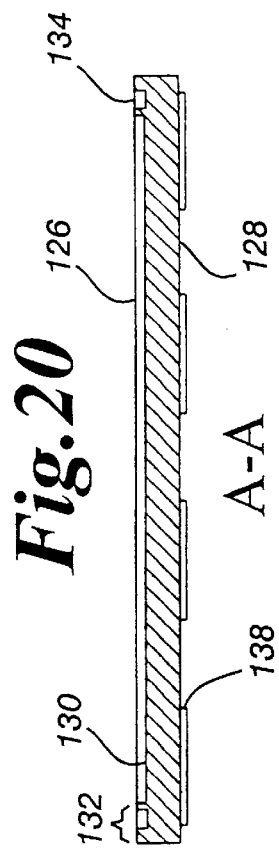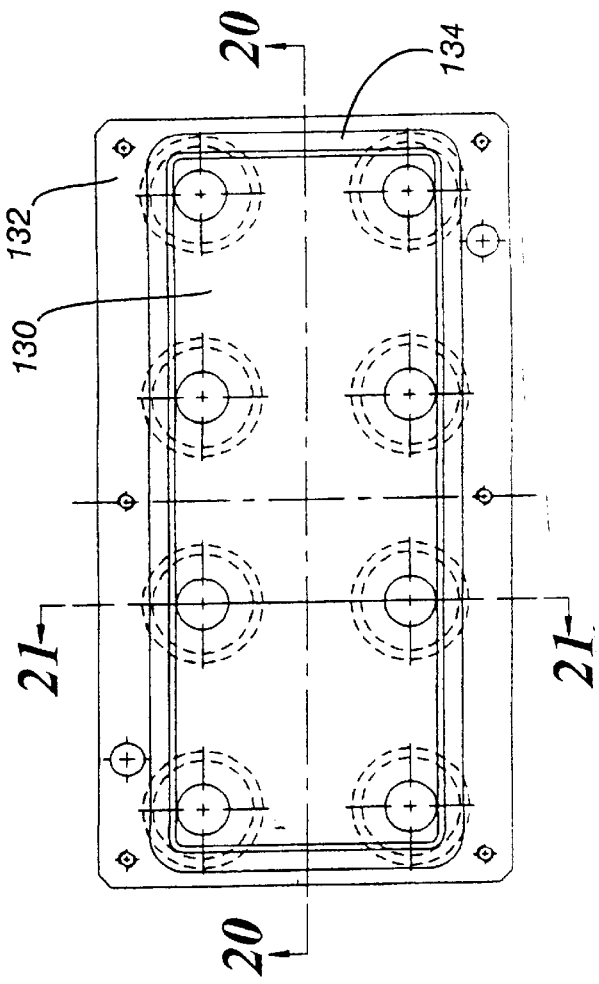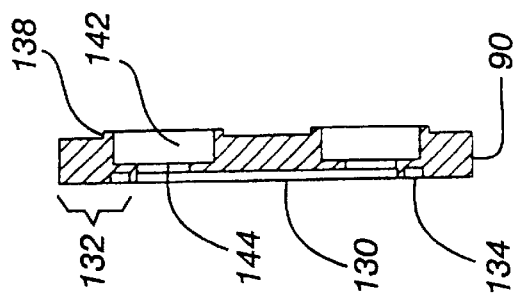

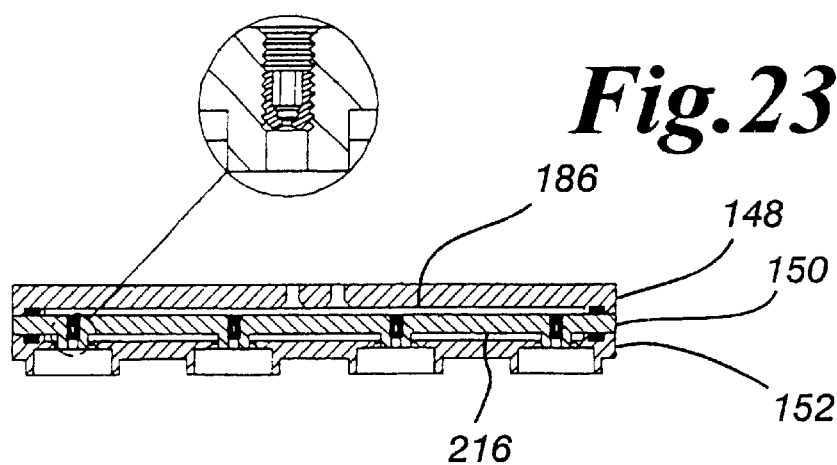
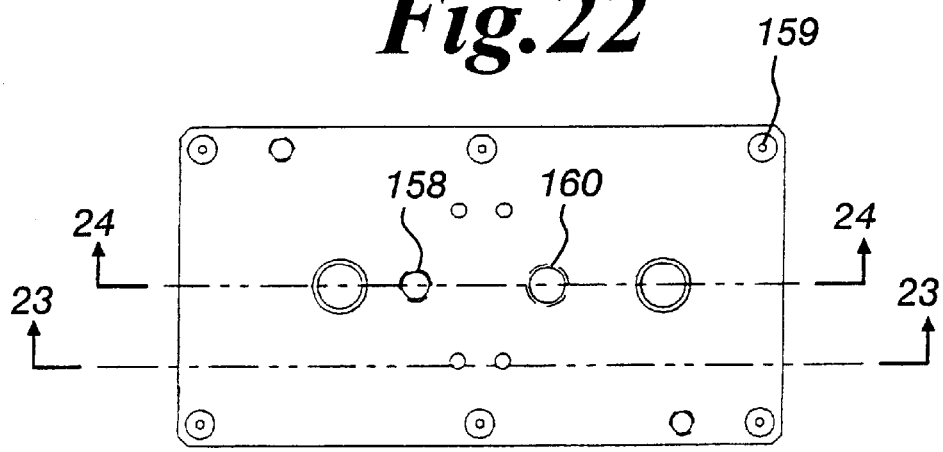
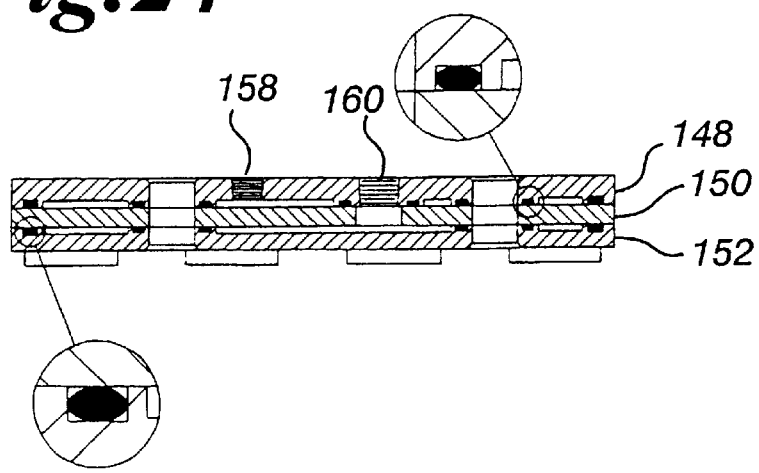

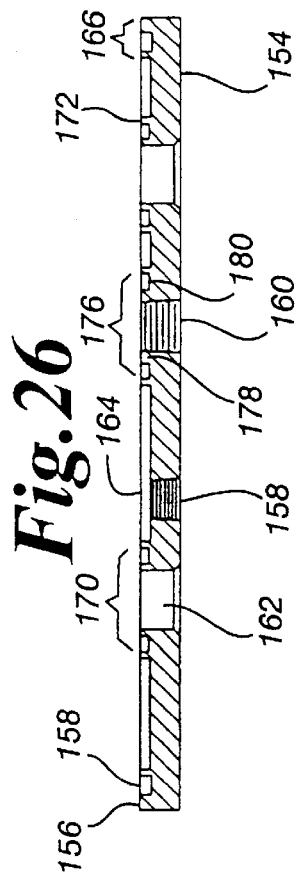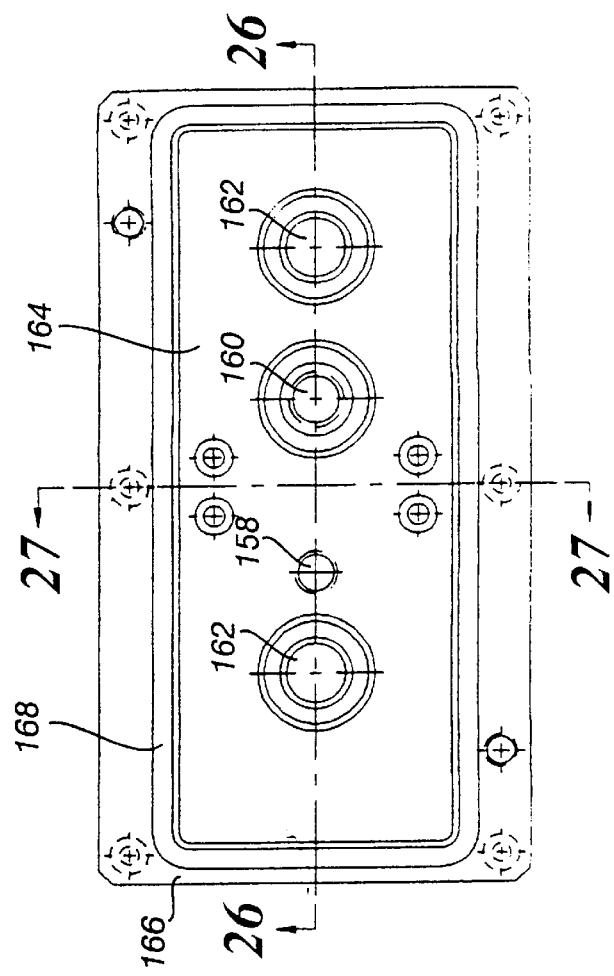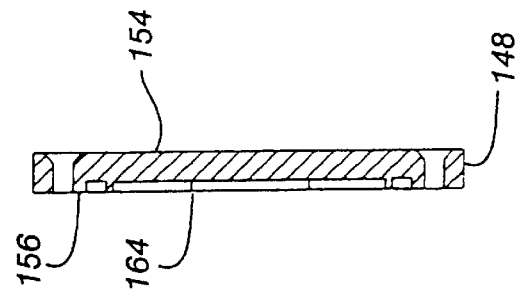

LENS MOLD CARRIERS

This application claims the benefit under U.S.C. 119(e) of U.S. provisional applications, Ser. No. 60/160,068, filed Sep. 30, 1998.

FIELD OF THE INVENTION

The invention relates to an apparatus for use in manufacturing ophthalmic components and more particularly, to an apparatus for carrying molds used to form ophthalmic components.

The manufacture of ophthalmic components, for example contact lenses, is typically carried out in a large number of separate production steps. Contact lenses are generally manufactured in automated or semi-automated production processes. Lens molds including base curve and front curve mold halves are transported on carriers through the production process. The molds are fitted together to form a small crescent shaped mold cavity between the base curve and front curve molds. A lens is formed by introducing a monomer lens formulation in the front curve mold and then sandwiching the monomer between the base curve and front curve molds. The monomer is then polymerized through heat treatment, light treatment or other polymerizing process, thus forming a lens. The lens is then removed from the molds for further treatment and is packaged for consumer use.

Typically, a lens production process uses sets of two matching carriers. One carrier holds a multitude of base curve lens molds, and another carrier holds a matching number of front curve lens molds. The mold carriers are transported to different processing stations within the lens manufacturing process and subjected to different processing steps. For example, the mold carriers receive lens molds in proper positions and are closed and locked to form lenses. Once the lenses are formed, the closed carriers are opened to remove the lenses. Consequently, the carriers must be designed to be suitable for many different steps of the lens manufacturing process.

There remains a need for improved carriers that are highly suitable for a lens production process, especially a large-scale lens production process.

SUMMARY OF THE INVENTION

The invention provides a front curve lens mold carrier and a base curve lens mold carrier. The front curve lens mold carrier includes a front curve top plate and a front curve bottom plate attached to the top plate. The front curve bottom plate has a plurality of holes and at least one stabilizing hold formed therein. The stabilizing hold engage elongated stabilizing member located on the base curve mold to stabilize the mold during monomer polymerization. The front curve top plate also has a plurality of holes formed therein. The top plate holes are in axial alignment with the bottom plate holes thereby providing an opening completely through the carrier when the top plate and the bottom plate are connected to each other. The top plate hole is separated into two sections, a first section and a second section, by a flange. A hollow piston, guided by the flange, travels up and down in the two sections of the top plate hole. The piston is supported by a spring housed in the second section of the top plate hole, which rests upon the top surface of the bottom plate. The top plate also has two top plate stabilizing holes in axial alignment with the bottom plate stabilizing holes. The top plate additionally has at least one channel that houses a locking bar.

The base curve lens mold carrier has a plurality of holes formed therein. The holes formed in the base curve lens mold carrier are divided into a first (or top) section and a second (or bottom) section. The base curve lens mold carrier also has a channel extending from the edge of the first section to the edge of the carrier which provides rotational alignment for the molds by engaging with a protrusion on the outer diameter of the lens mold flange. The base curve lens mold carrier also includes at least one elongated stabilizing member which is in axial alignment with the stabilizing hole formed in the front curve lens mold carrier and which engage with the stabilizing hole to form a stable mold for manufacturing a contact lens. The carriers are transported to various stations within the lens manufacturing process, including lens mold receiving station and lens mold cleaning station.

The carriers of the present invention can be fabricated from various rigid materials including various metal, e.g., steel, stainless steel, aluminum, aluminum alloy, brass and the like. The carriers are highly suitable for carrying ophthalmic lens molds to various stations of a lens manufacturing process, and are highly adapted for automated stations of the process.

BRIEF DESCRIPTION OF THE DRAWINGS

FIG. 2 is a top view of a front curve lens mold carrier;

FIG. 3 is a cross-section of the front curve lens mold carrier of FIG. 2 taken along line 3—3;

FIG. 13 is a top view of a front curve mold cleaning assembly top plate;

FIG. 14 is a cross-section of the front curve mold cleaning assembly top plate of FIG. 13 taken along line 14—14;

FIG. 15 is a cross-section of the front curve mold cleaning assembly top plate of FIG. 13 taken along line 15—15;

FIG. 16 is top view of a front curve mold cleaning assembly middle plate;

FIG. 17 is a cross-section of the front curve mold cleaning assembly middle plate of FIG. 16 taken along line 17—17;

FIG. 18 is a detailed view of the front curve mold cleaning assembly of FIG. 11 showing channels of fluid communication;

FIG. 19 is a top view of a front curve cleaning mold assembly bottom plate;

FIG. 20 is a cross-section of the front curve mold cleaning assembly bottom plate of FIG. 19 taken along line 20—20;

FIG. 21 is a cross-section of the front curve mold cleaning assembly bottom plate of FIG. 19 taken along line 21—21;

FIG. 22 is a top view of a base curve mold cleaning assembly according to the invention;

FIG. 23 is a cross-section of the base curve mold cleaning assembly of FIG. 22 taken along line 23—23;

FIG. 24 is a cross-section of the base curve mold cleaning assembly of FIG. 22 taken along line 24—24;

FIG. 25 is a top view of a base curve mold cleaning assembly top plate;

FIG. 26 is a cross-section of the base curve mold cleaning assembly top plate of FIG. 25 taken along line 26—26;

FIG. 27 is a cross-section of the base curve mold cleaning assembly top plate of FIG. 25 taken along line 27—27;

DESCRIPTION OF THE PREFERRED EMBODIMENTS

Figure 1:
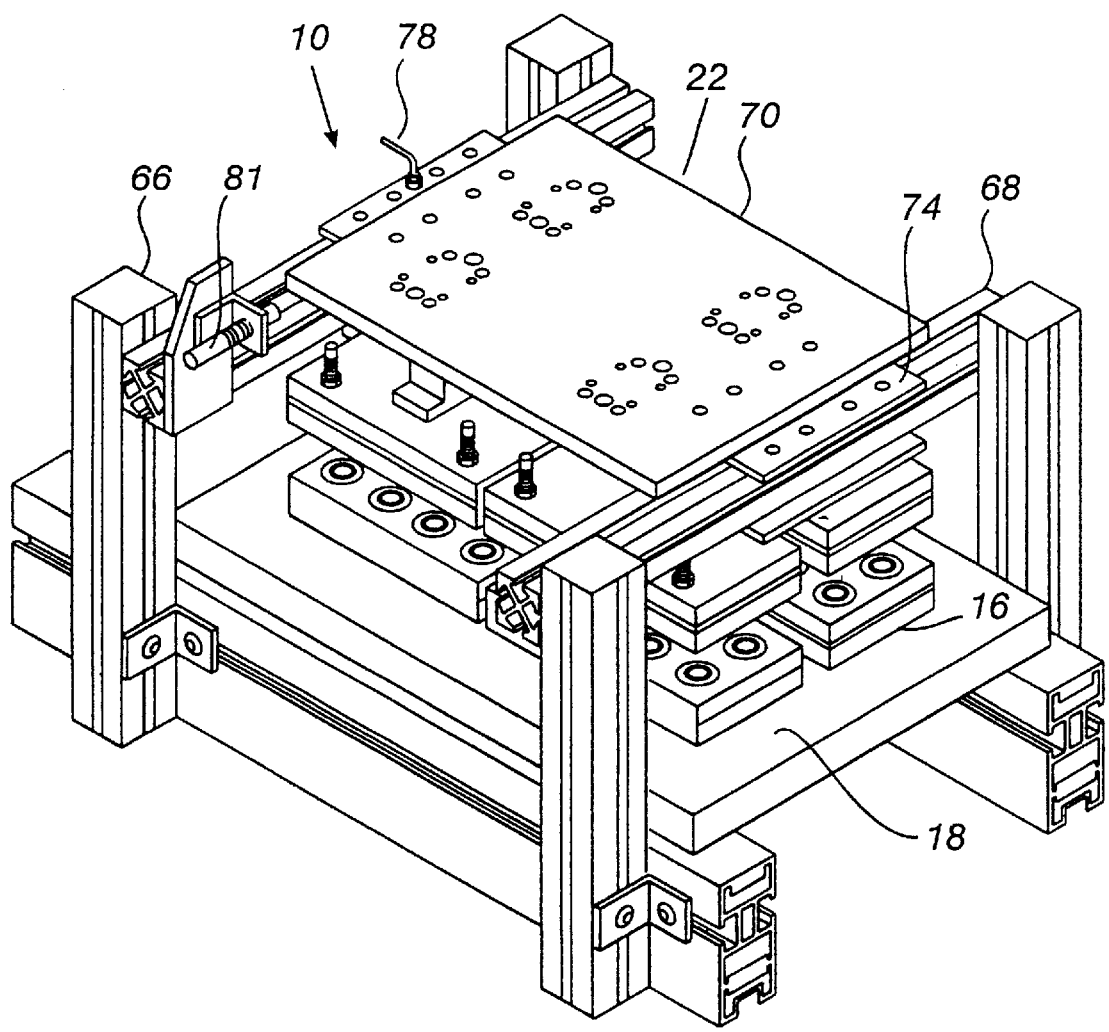
FIG. 1 is a perspective view of a preferred embodiment of an apparatus for use in manufacturing ophthalmic components according to the invention.

In the following description, like reference numerals designate like or corresponding parts throughout the several figures. It is to be also understood that such terms as "front", "rear", "side", "up", and "down" are used for purposes of locating one element relative to another and are not to be construed as limiting terms. Further, it should be understood that the illustrations are for the purpose of describing preferred embodiments of the invention, and thus are not intended to limit the invention in any manner.

Figure 7:
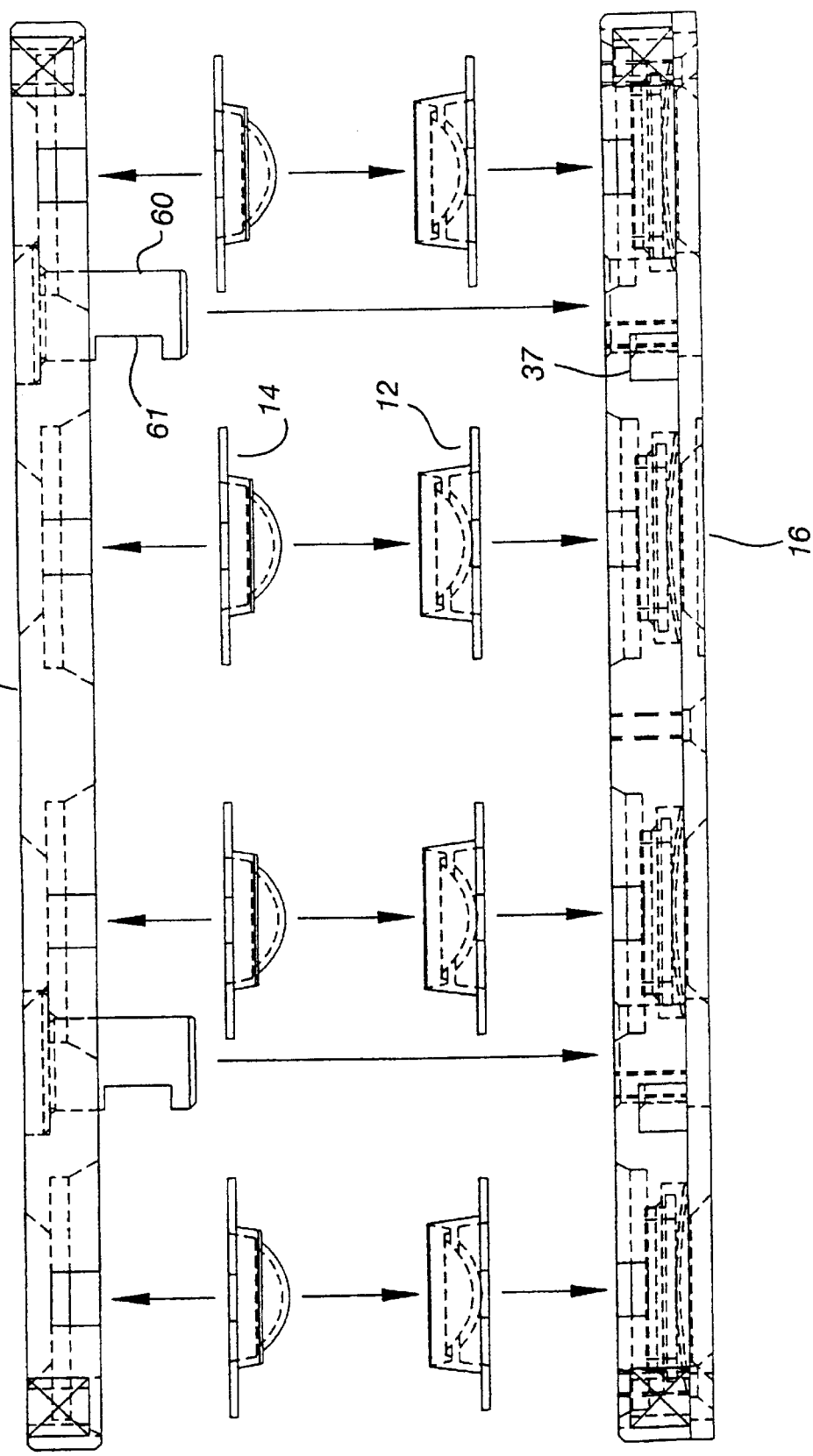
FIG. 7 is an elevation view showing how the front curve lens mold carrier and the base curve lens mold carrier join to form completed lens molds.

Referring now to the drawings, FIG. 1, is a perspective view of an apparatus, indicated generally at 10, for use in the manufacture of ophthalmic components, especially contact lenses. In particular, the apparatus 10 is a cleaning device designed to provide automated cleaning of contact lens molds. Contact lens molds typically have two parts: a front curve lens mold 12 and a base curve lens mold 14. FIG. 7. To manufacture a contact lens, a polymerizable formulation is placed into the front curve lens mold. The base curve mold is then placed in contact with the front curve mold and the polymerizable formulation is allowed to polymerize.

The cleaning device 10 of FIG. 1 has a front curve lens mold carrier 16, a base curve lens mold carrier 18, a means for conveying the lens mold carriers 20, and a cleaning station 22. Preferably, the cleaning device 10 is designed such that it is capable of cleaning multiple front and base curve lens molds simultaneously. While the embodiment shown in the figures is designed to clean 16 front curve lens molds (2 sets of 8) and 16 base curve lens molds (2 sets of 8) it should be understood that the invention could be easily modified to create a device designed to clean any multiple of front or base lens molds. Similarly, the invention could easily be modified to clean lens molds arranged in circular carriers rather than in the rectangular carriers shown in the figures. The particular embodiment shown in the figures should not be viewed as limiting the scope of the invention or the claims.

Overview

Figure 6:
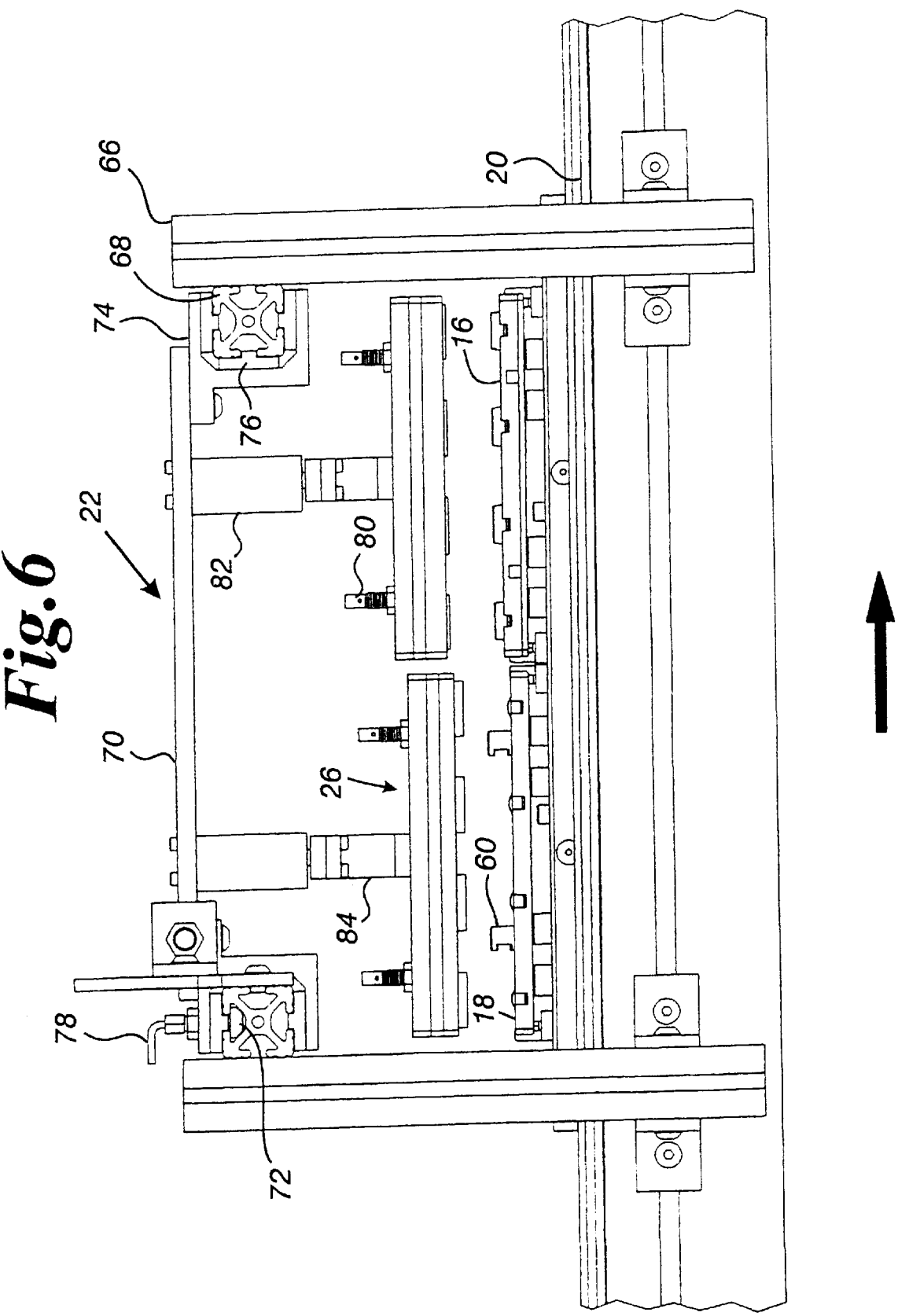
FIG. 6 is an elevation view of the apparatus of FIG. 1 showing the cleaning assemblies positioned over the lens mold carriers.

Referring now to FIG. 1 and FIG. 6, two front curve lens mold carriers 16, each holding eight front curve lens molds, and two base curve lens mold carriers 18 are transported to a cleaning station 22, by a conveying means 20. At cleaning station 22 the lens mold carriers are positioned under lens mold cleaning assemblies 24 and 26. Cleaning assemblies 24 and 26 are lowered and placed in close proximity to the lens molds which are carried by lens mold carriers 16 and 18. Compressed gas is then blown onto the lens molds to dislodge any debris that may be present. A vacuum removes any debris. The cleaning assemblies are then retracted and the lens mold carriers proceed to the polymer injection station. The apparatus and process will be discussed in greater detail below.

Front Curve Lens Mold Carriers

A front curve lens mold carrier ("front curve carrier") is shown in FIG. 2 and FIG. 3. The front curve carrier 16, has two plates; a top plate 28, and a bottom plate 30 which are fixedly attached. Bottom plate 30 contains a plurality of holes 32, which provide fluid communication through bottom plate 30. Bottom plate 30 also contains two stabilizing slots 34.

Top plate 28 having a top and bottom surface, contains a plurality of holes 36, which provide fluid communication through the top plate 28. Top plate holes 36 are in axial alignment with bottom plate holes 32 thereby providing fluid communication through top plate 28 and bottom plate 30. Top plate holes 36 have a top (or first) section 38, having a first outer diameter, and a bottom (or second) section 40, having a second outer diameter smaller than the first outer diameter and separated by a top plate flange 42. The top section 38 is adapted to receive a front curve mold and may have a conical opening to assist proper placement of the mold in the section. Optionally, an alignment channel 44, which extends from first section 38 to the outer perimeter of the top plate 28, can be formed. The channel 44 can be used to precisely align the front curve lens mold 12, if the mold is equipped with an extended protrusion in the mold flange.

The bottom section 40 of the top plate hole 36 is situated beneath flange 42 and abuts hole 32 thereby creating fluid communication through front curve carrier 16. The outer diameter of hole 32 is smaller than the outer diameter of the bottom section 40 thereby creating a ledge 46 at the junction of hole 32 and the bottom section 40. The top plate 28 also contains two stabilizing holes 34 that are in axial alignment with bottom plate stabilizing holes.

A spring 48 with a void in the middle, e.g., a washer spring, is situated within the bottom section 40 and rests upon ledge 46. A hollow piston 50, is situated in the path of travel created by flange 42, and the piston 50 at the bottom edge has an extended lip that prevents the piston 50 from slipping out of the path of travel. Piston 50 rests upon spring 48 and has freedom of vertical movement. In the absence of tension exerted upon the spring, the top of piston 50 rests slightly above the top of flange 42 as shown in FIG. 3. When front curve lens mold carrier 16 joins with base curve carrier 18 during lens formation, FIG. 7, spring 48 provides tension between the front curve mold 12 and the base curve mold 14 to securely holding the two molds in a properly closed configuration. The tension provided by the spring 48 may vary depending on the design of the lens molds. Preferably, the spring provides a compression force between 8 pounds and 20 pounds, more preferably between 9 pounds and 17 pounds, most preferably between 10 pounds and 15 pounds, on the lens molds when the front curve and back curve carriers are closed. The front curve carrier additionally has two locking bars 35 that are housed in two locking bar channels 37. The locking bar channels 37 are channels formed in the top plate 28 that allows the locking bars 35 to make guided sliding movements. When the top plate 28 and the bottom plate 30 are joined, the locking bars 35 can only make the sliding movements. The channel 37 also has a stopping pin 33 which restricts the extent of the sliding movement of the locking bar 35. As discussed further below, the locking bars are used to lock the front curve carrier with the base curve carrier.

It is to be noted that although the lens mold carriers are illustrated with the springs 48 and the pistons 50 that are placed in the front curve lens mold carrier, the springs and pistons can be placed in the base curve lens mold carrier or in both carriers to provide the tensioning function.

Base Curve Lens Mold Carriers

Figure 4:
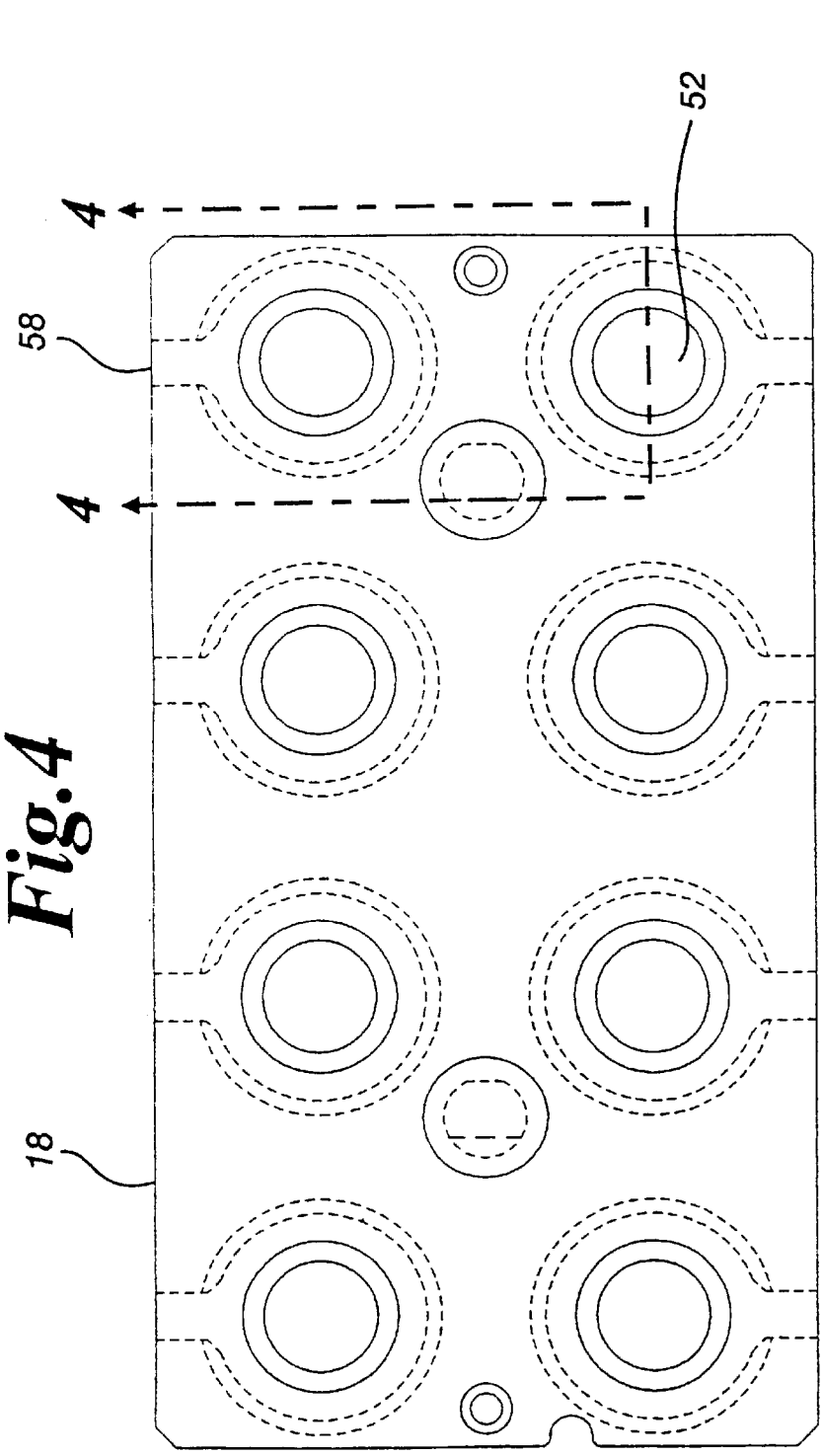
FIG. 4 is a top view of a base curve lens mold carrier.

A base curve lens mold carrier (or base curve carrier) is shown in FIG. 4. The base curve carrier 18 is a solid plate having top and bottom surfaces. Alternatively, the base curve carrier can be a joined composite plate having a top plate and a bottom plate. Base curve carrier 18 contains a plurality of holes 52, which provide fluid communication through base curve carrier 18. Holes 52 are arranged such that they form axial alignment with holes 36 of the front curve carrier 16 when the two curve carriers are joined. FIG. 7.

Figure 5:
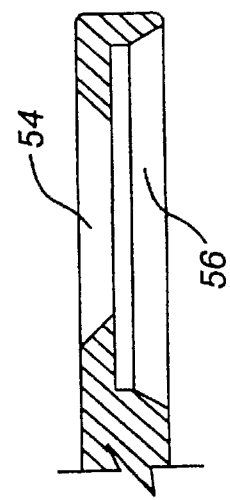
FIG. 5 is cross-section of the base curve lens mold carrier of FIG. 4 taken along line 4—4.

Base curve carrier holes 52 have a top (or first) section 54 having a first outer diameter and a bottom (or second) section 56 having a second outer diameter smaller than the first outer diameter. The top section 54 is adapted to receive a base curve lens mold, and the top section 54 may have a conical opening to assist proper placement of the mold. FIG. 5. optionally, base curve carrier 18 has an alignment channel 58, which extends from top section 54 to the outer perimeter of base curve carrier 18, to provide a rotational alignment for the lens mold by engaging with protrusion on the outer edge of the lens mold flange, if the lens mold has such a rotation stabilization protrusion.

Base curve carrier 18 additionally has two elongated stabilizing members 60, and each of the stabilizing members 60 has a locking notch 61. FIG. 7. Elongated stabilizing members 60 are in axial alignment with the stabilizing holes 34 in the front curve carrier 16. Elongated stabilizing members 60 guide the base curve carrier onto the front curve carrier when they are being paired and precisely engage with stabilizing holes 34 of the front curve carrier. The precise engagement of the two lens mold carriers allows the front curve and back curve lens molds, which are placed in the carriers, to form a properly and stably closed lens mold pair.

After base curve carrier 18 and front curve carrier 16 are joined by engaging elongated stabilizing members 60 with stabilizing holes 34, locking bars 35 (FIG. 2) in front curve carrier 16 are engaged with locking notches 61 of elongated stabilizing members 60 of base curve carrier 18, FIG. 7. Locking bars 35 travel in front curve top plate locking bar channel 37 and intersects stabilizing holes 34. Locking bar 35 contains a semicircular notch 39 with an arc at least equal to that of stabilizing hole 34. When notch 39 is aligned with stabilizing hole 34, the front curve assembly is in the "open" position and can receive elongated stabilizing member 60 of the base curve carrier. When elongated stabilizing members 60 are in place, locking bar 35 is moved along locking bar channel 37 such that notch 39 is no longer in alignment with stabilizing hole 34, and locking bar 35 is engaged with locking notch 61 of the stabilizing member 60. When the locking notch 61 and the locking bar 35 are engaged, the front curve carrier and the back curve carrier are securely closed and locked in proper position. FIG. 7. Desirably, the open and closed positions of the locking bar 35 are assisted by a spring-assisted ball pointer and position notches on the locking bar 35. For example, the locking bar 35 has a small open position notch and a small closed position notch on the surface opposite of the semicircular notch 39, and a spring-assisted ball pointer is placed in the front curve carrier to engage the position notches. As the locking bar is moved along the locking bar channel 37 from the open position to the closed position, the ball of the ball pointer is disengaged from the open position notch and rolls along the surface of the locking bar 35 until it is engaged with the closed position notch, thereby providing precise open and closed positions. The locking bar 35 can be slidably moved in the locking bar channel 37 with an elongated object, e.g., a rod, that can travel through the channel 37 and pushes the ends of the locking bar 35. It is to be noted that although the present invention is illustrated with a stabilizing member 60 with a locking notch 61, other locking configurations can be used in place of the notch, e.g., a bore in the stabilizing member. In addition, the placement of the stabilizing members and the stabilizing holes along with the locking bars can be changed, e.g., the stabilizing members are placed in the front curve carrier and the stabilizing slots are formed in the back curve carrier.

The mold carriers of the present invention are particularly suitable for use in an automated process. As a preferred embodiment of the invention, the matching front curve and back curve carriers having at least two stabilizing members and at least two matching stabilizing holes ensure that the matching carriers are easily and precisely aligned. The stabilizing members and the stabilizing holes make the process for closing the two matching carriers simple and reliable. In addition, the sliding bar locking system of the carriers makes the locking process simple such that the locking and unlocking processes can be readily automated.

Conveying Means

The conveying means 20 could be any type of conveyor or conveyor belt. In a preferred embodiment, shown in FIG. 9, the conveying means consists of a solid pallet upon which the lens mold carriers are secured and a conveyor which transports the lens molds to cleaning station 22 and on to further processing.

The Cleaning Station

The cleaning station 22 is comprised of a frame, at least one lens mold cleaning assembly (front curve or base curve), and a means for positioning the lens mold cleaning assembly over the lens mold carriers. In a preferred embodiment, shown in FIG. 1 and FIG. 6, the cleaning station frame comprises four legs 66 placed substantially symmetrically about one point. The legs are spaced apart to form an area between the legs sufficient for a conveyor or other conveying means 20 to pass between and through the legs. Cross support members 68 are attached to the legs 66 and are parallel to one another. A mounting plate 70 is movably attached to the cross support members 68. When connected, the mounting plate 70 the cross support members 68 and the legs 66 form a frame with a generally table like arrangement.

Figure 8:
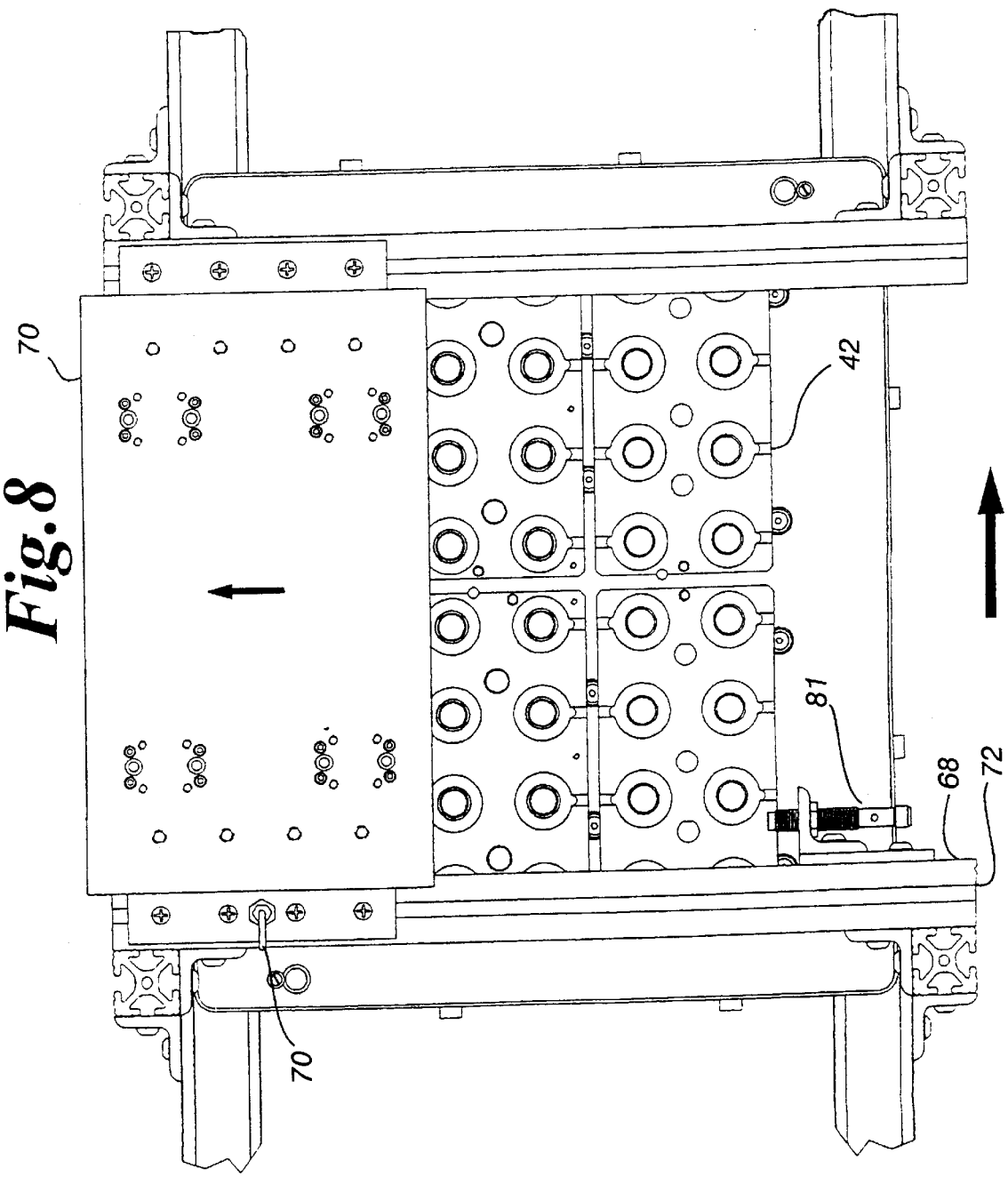
FIG. 8 is a top view of the apparatus of FIG. 1 showing the mounting plate moved to the side.

Cross support members 68 contain grooves 72 which run longitudinally down the length of cross support members 68 allowing the mounting plate 70 to move in a horizontal fashion relative to cross support members 68. In the preferred embodiment shown in FIG. 6, mounting plate 70 is fixedly attached to a bracket and bushing assembly 74 which contains three bushings, 76. The bracket and bushing assembly 74 is attached to the cross support member 68 such that the bushing 76 fits within groove 72. In this manner the mounting plate 70 may move horizontally with respect to cross support members 68 while remaining attached to cross support members, 68. FIG. 8. Providing horizontal movement for mounting plate 70 allows easy inspection of the device or lens molds in the event non-optimum operation of the cleaning device is observed. For example, horizontal movement of mounting plate. 70 allows an operator access to the mold carriers to reseat misplaced molds as determined by proximity sensors 80.

At least one securing mechanism 78 is provided to secure the position of the mounting plate 70 with respect to the cross support members 68. The securing mechanism could be a set screw securing the bracket and bushing assembly 74 to the cross support members 68 or any other securing device. In a preferred embodiment shown in FIG. 1 and FIG. 6, the securing mechanism 78 consists of a spring loaded pin that secures mounting plate 70 when pressed down through a hole in cross support member 68. Proximity sensor 81 is employed to ensure that mounting plate 70 is properly aligned and secured before the cleaning station can be activated.

Means For Positioning Mold Cleaning Assemblies

Referring now to FIG. 6 and FIG. 8, attached to the bottom surface of mounting plate 70 are a plurality of means for positioning lens mold cleaning assemblies 82. In the preferred embodiment shown in FIG. 6 and FIG. 8, the means for positioning 82 are four pneumatic cylinders which are attached to a source of compressed gas (not shown). The pneumatic cylinders are arranged substantially symmetrically and attached to the bottom surface of mounting plate 70. Although the preferred embodiment of the invention utilizes pneumatic cylinders, it is to be understood that any means for providing vertical movement such as hydraulic cylinders, electric motors or mechanical hand cranks may be employed.

Front and Base Curve Cleaning Assemblies

Figure 9:
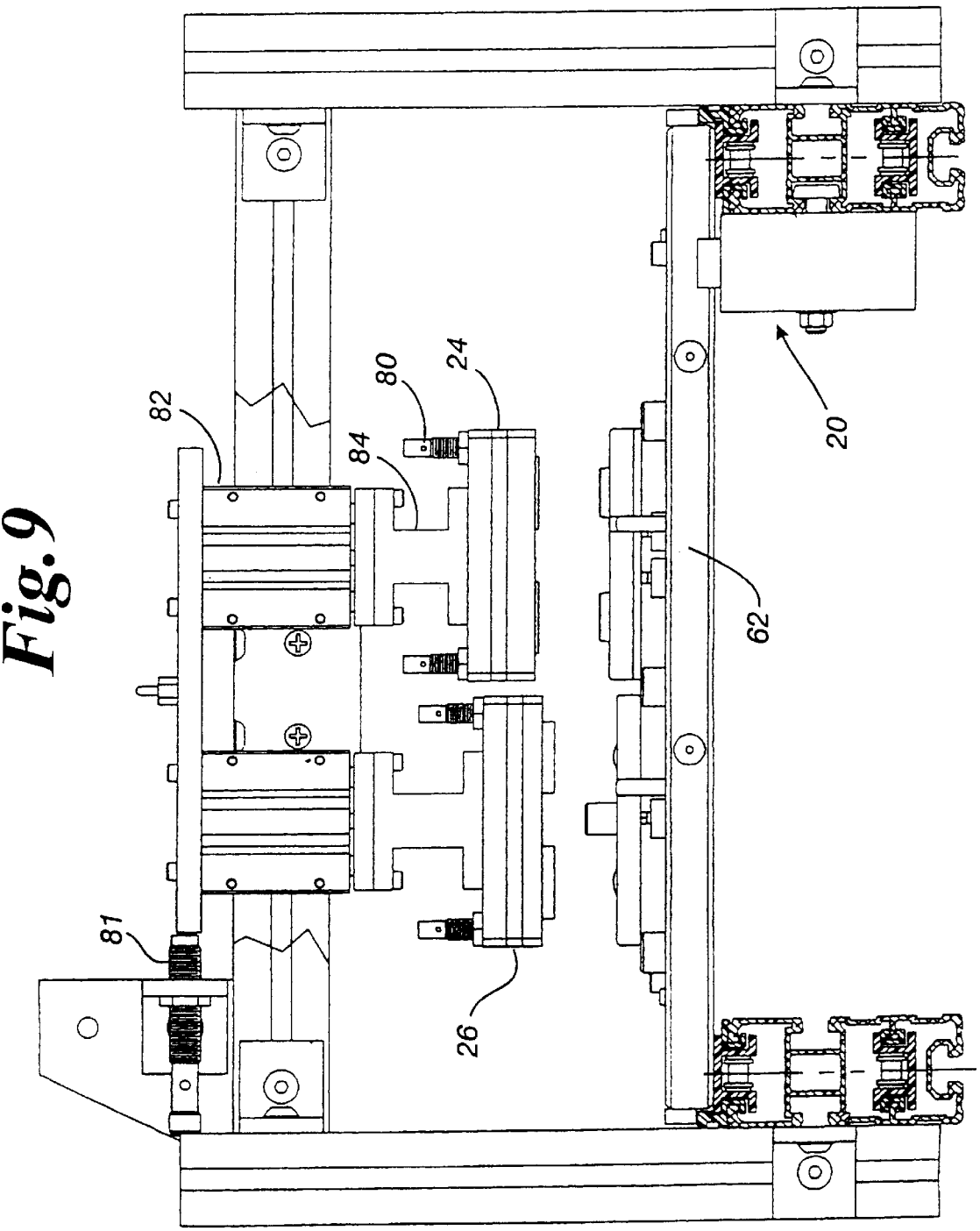
FIG. 9 is an end view of the apparatus of FIG. 1 showing the cleaning assemblies positioned over the lens mold carriers with a portion of a cross support member removed for clarity.

In a preferred embodiment shown in FIG. 1, FIG. 6, and FIG. 9, four cleaning assemblies are shown: two front curve lens mold cleaning assemblies 24 and two base curve lens mold cleaning assemblies 26. Each cleaning assembly is connected to pneumatic cylinders 82 by means of a connector 84. Each front curve and base curve cleaning assembly consists of three joined plates that allow fluid communication through the plates.

Front Curve Cleaning Assembly

Figure 11:
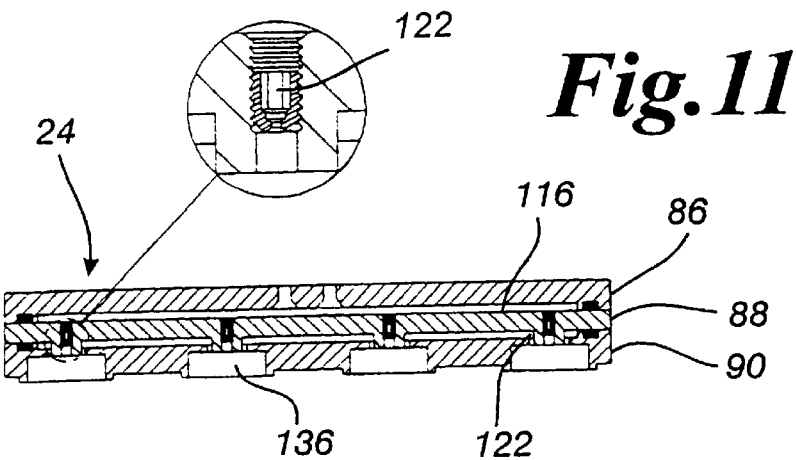
FIG. 11 is a cross-section of the front curve mold cleaning assembly of FIG. 10 taken along line 11—11.
Figure 10:
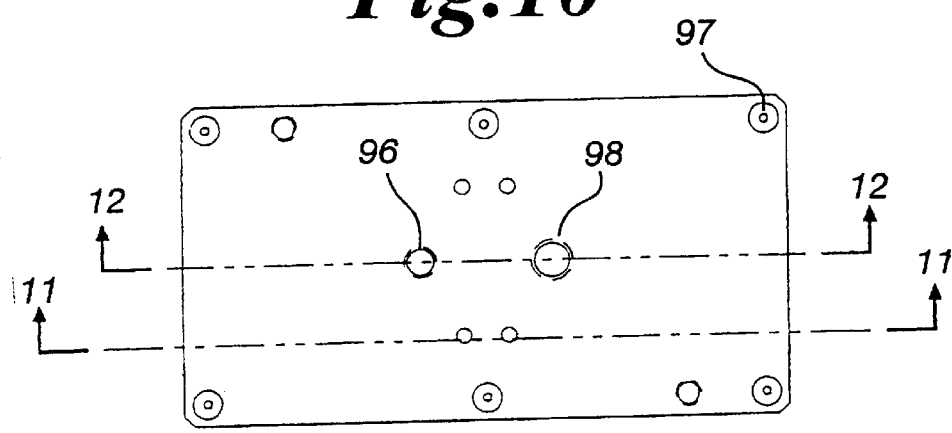
FIG. 10 is a top view of a front curve mold cleaning assembly according to the invention.
Figure 12:
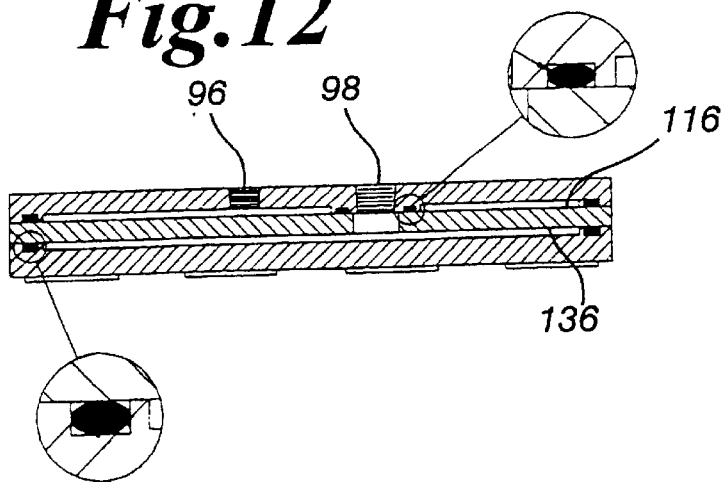
FIG. 12 is a cross-section of the front curve mold cleaning assembly of FIG. 10 taken along line 12—12.

Referring now to FIG. 10, FIG. 11, and FIG. 12, the front curve cleaning assembly 24 is formed by a top plate 86 a middle plate, 88, and a bottom plate 90. The three plates are of approximately equal outer dimension, said dimension being approximately equal to the outer dimension of front curve carrier 16. In a preferred embodiment, the three plates are generally rectangular and of such a size to allow at least eight symmetrically arranged lens molds to fit within its dimensions.

Referring now to FIG. 13, FIG. 14, and FIG. 15, a top plate 86 having a top surface 92 and a bottom surface 94 gas injection hole 96 and vacuum hole 98 is attached to connector 84. The bottom surface 94 contains a milled recess 100, said recess having an outer perimeter generally smaller than and symmetrical with the outer perimeter of said top plate 86 thereby creating an outer ridge 102 along the outer perimeter of the plate. The recess also has a cylindrical island 104 on bottom surface 94 through which vacuum hole 98 passes to form circular ridge 106. Ridges 102 and 106 contain channels 108 and 110 respectively, which accommodate O-rings or some other appropriate sealing device. FIG. 12.

Gas injection hole 96 establishes fluid communication between front curve top plate top surface 92 and recess 100. Fluid communication between top surface 92 and bottom surface 94 is established by vacuum hole 98.

Referring now to FIG. 11, FIG. 16 and FIG. 17, a front curve middle plate 88 having a top surface 112 and bottom surface 114 is attached to front curve top plate 86 thereby forming a cavity 116 defined by middle plate top surface 112 and the recess 100 of top plate 86. FIG. 10 and FIG. 18. O-rings or some other appropriate sealing device seal cavity 116. Front curve middle plate 88 contains a hole 118 in axial alignment with top plate vacuum hole 98 and of approximately the same diameter as top plate vacuum hole 98. Hole 118 and vacuum hole 98 provide fluid communication between the top surface of the top plate 92 and the bottom surface of the middle plate 114.

The front curve middle plate 88 also contains a plurality of orifices 120 providing fluid communication between cavity 116 and middle plate bottom surface 114. In a preferred embodiment, there are eight orifices 120 which are arranged symmetrically. The orifices 120 preferably contain a nozzle 122 or other means to direct the flow of gas through orifice 120. FIG. 11 and FIG. 18. Annular extensions 124 which are in axial alignment with orifices 120 and which have an inner diameter approximately equal to the diameter of orifices 120 extend from the middle plate bottom surface 114. Nozzle 122 and annular extensions 124 direct the flow of compressed gas to the lens molds. FIG. 18.

Referring now primarily to FIG. 19, FIG. 20, and FIG. 21, a front curve bottom plate 90 having a top surface 126 and a bottom surface 128 is attached to front curve middle plate 88. FIG. 11. The top surface 126 contains a recess 130 having an outer perimeter generally smaller than and symmetrical with the outer perimeter of the bottom plate 90 thereby creating an outer ridge 132 along the outer perimeter of the plate. Ridge 132 contains channel 134 which accommodates an O-ring. FIG. 12. When front curve bottom plate 90 is attached to front curve middle plate 88, a cavity 136 as shown in FIG. 11, FIG. 12 and FIG. 18 is created by recess 130 and middle plate bottom surface 114.

Referring now to FIG. 18, front curve bottom plate bottom surface 128 contains a plurality of raised cylindrical portions 138 having an inner diameter and an outer diameter thereby defining a cylindrical ridge 140 and a cylindrical wall of a recess 142, situated within cylindrical portion 138. Optionally, a sealing means, especially an elastomeric sealing means, e.g., o-ring, is attached to the cylindrical ridge 140. Recess 142 extends to a point intermediate top surface 126 and bottom surface 128. In a preferred embodiment, shown in FIG. 20 and FIG. 21, there are eight raised cylindrical portions 138 symmetrically arranged and in axial alignment with front curve middle plate orifices 120.

A second cylindrical recess 144 having a diameter smaller than the diameter of cylindrical recess 142 extends downward from the bottom of recess 130. Second cylindrical recess 144 is axially aligned with cylindrical recess 142 and is in fluid communication with cavity 136 and cylindrical recess 142. Second cylindrical recess 144 is of sufficient diameter to allow middle plate annular extension 124 to substantially occupy recess 144 thereby defining an annular space 146. Annular space 146 maintains fluid communication between cylindrical recess 142 and cavity 136. FIG. 18.

Operation of the Front Curve Mold Cleaning Assembly

In operation, the front curve mold cleaning assemblies 24 and front curve lens mold carriers 16 are arranged so that cylindrical recesses 142 are in axial alignment with front curve lens mold carrier top plate holes 36. The front curve cleaning assembly 24 is lowered by positioning means 82 to place the ridge 140 close to the flange of the lens mold 12, e.g., approximately 1/15,000 of an inch from the base of a front curve lens mold. FIG. 18. Alternatively, especially when the, ridge 140 is equipped with sealing means, the front curve cleaning assembly 24 is lowered to place the sealing means of the ridge 140 on the flange of the lens mold 12, thereby pneumatically sealing the lens mold 12 and the cylindrical recess 142.

Two channels of fluid communication into cylindrical recess 142 are present. The first channel consisting of hole 96, cavity 116, orifices 120, and annular extensions 124, allow compressed gas to flow at greater than atmospheric pressure from an outside source (not shown) into cylindrical recess 142 to dislodge any debris residing on the lens mold. Gases suitable for the invention include nitrogen, carbon dioxide and air. FIG. 18. The second channel of fluid communication is under the influence of a vacuum and is used to remove the gas and debris located in recess 142. Beginning with recess 142, the gas and any debris present leave recess 142 via annular space 146 and proceed through cavity 136, through middle plate vacuum hole 118 and out top plate vacuum hole 98 into a vacuum line (not shown). Gas injection and application of the vacuum can occur independently, simultaneously or sequentially and can be of variable duration. For example, the vacuum is applied first and then quickly the pressurized gas is applied to ensure that all the debris located on the lens mold and in the recess 142 is removed through the annular space 146.

Base Curve Cleaning Apparatus

Referring now to FIG. 9, FIG. 22, FIG. 23, and FIG. 24, the base curve cleaning assembly 26 is formed by a top plate 148, a middle plate 150, and a bottom plate 152. The three plates are of approximately equal to the outer dimension of the base curve lens mold carrier 18. In a preferred embodiment, the plates are generally rectangular and of such a size to allow at least eight symmetrically arranged lens molds to fit within its dimensions.

Referring now to FIG. 25, FIG. 26, and FIG. 27, a top plate 148, having a top surface 154, and a bottom surface 156, gas injection hole 158, vacuum hole 160, and stabilizing slots 162, is attached to a connector 84. The bottom surface 156 contains a milled recess 164, having an outer diameter generally smaller than and symmetrical with the outer perimeter of said top plate 148, thereby creating a ridge 166 along the outer perimeter of the plate. Ridge 166 contains channel 168 which houses an o-ring or other appropriate sealing device. FIG. 24. The recess also contains raised cylindrical portions 170 and 176 situated in the central portion of bottom surface 156. Raised cylindrical portions 170 house stabilizing slots 162 thereby creating cylindrical ridges 172 which contain channels 174. Channels 174 house o-rings or other appropriate sealing devices. FIG. 26.

Raised cylindrical portion 176 houses vacuum hole 160 thereby creating cylindrical ridge 178 which contains channel 180. Channel 180 houses an o-ring or other appropriate sealing device. FIG. 24.

Figure 28:
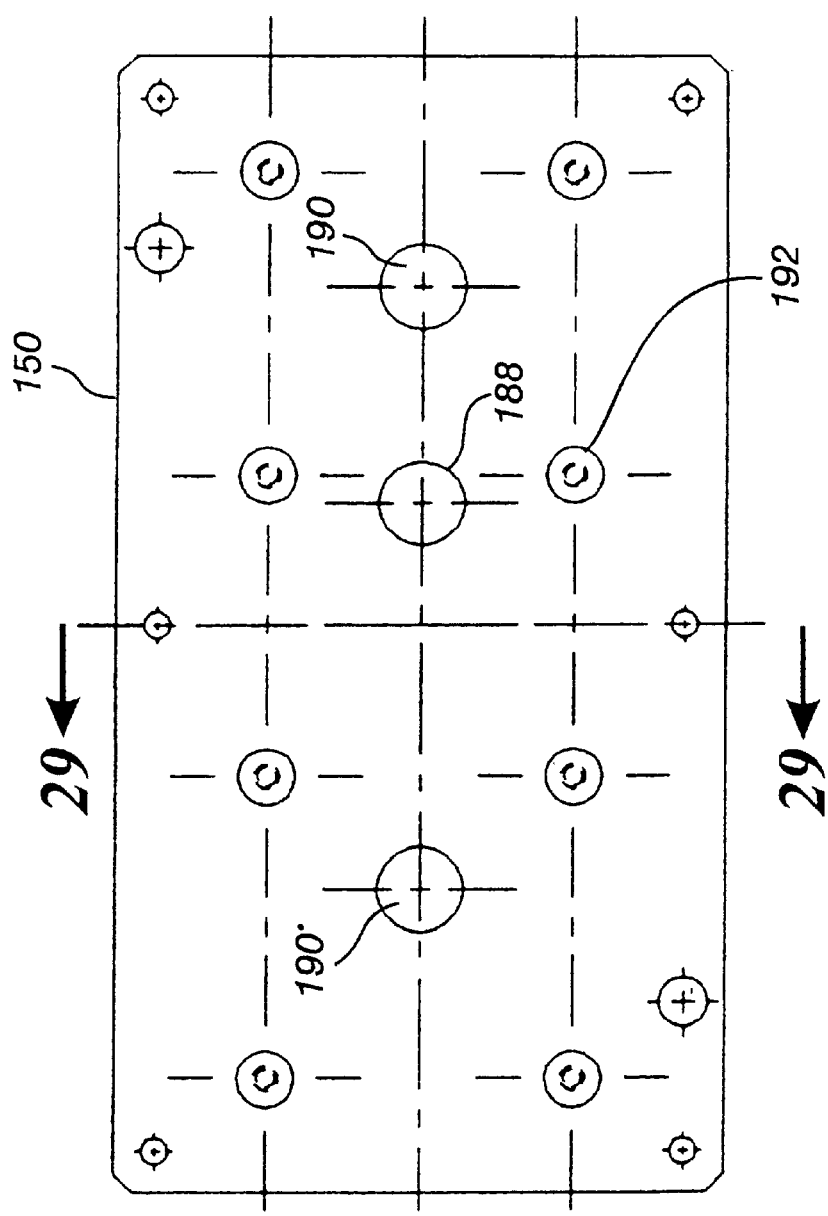
FIG. 28 is a top view of a base curve mold cleaning assembly middle plate.
Figure 29:
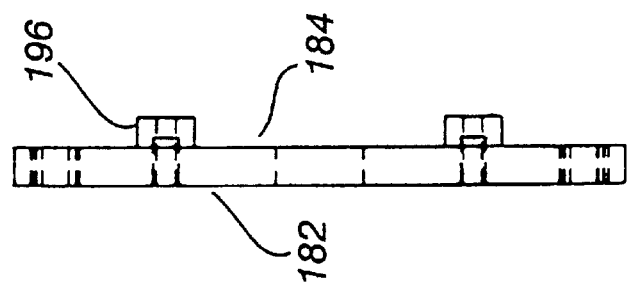
FIG. 29 is a cross-section of the base curve mold cleaning assembly middle plate of FIG. 28 taken along line 29—29.

Referring now to FIG. 28 and FIG. 29, a base curve middle plate, 150, having a top surface 182 and bottom surface 184 is attached to the base curve top plate 148, thereby forming a cavity 186 defined by middle plate top surface 182 and top plate recess 164. Base curve middle plate 150 contains a hole 188 in axial alignment with base curve vacuum hole 160 and of approximately the same diameter as vacuum hole 160. Hole 188 and vacuum hole 160 establish fluid communication between the top surface of the base curve top plate 154 and the bottom surface of the base curve middle plate 184. Base curve middle plate 150 also contains two holes or stabilizing slots 190 that are in axial alignment and of approximately the same diameter as top plate stabilizing slots 162.

Figure 33:
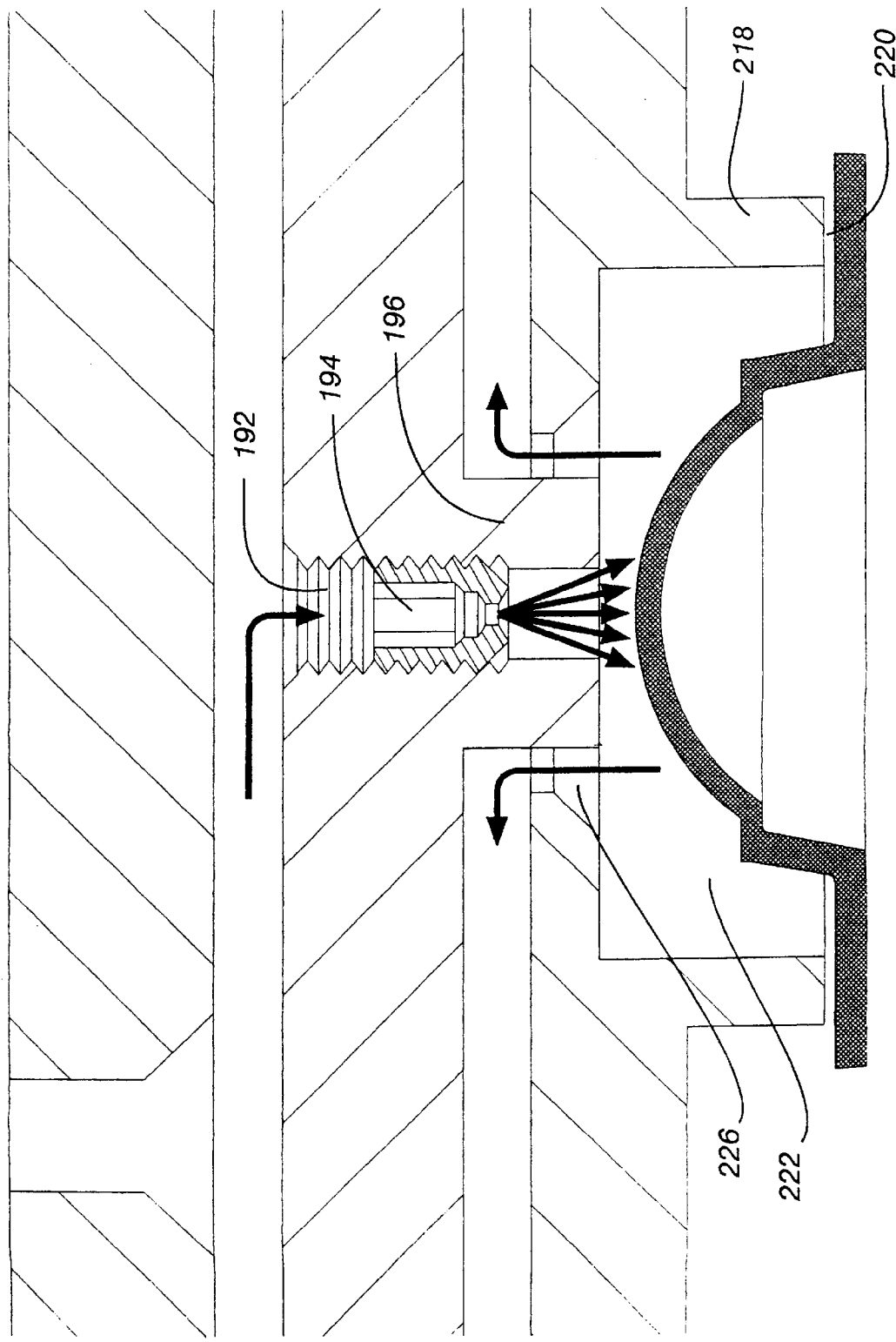
FIG. 33 is a detailed view of the base curve mold cleaning assembly of FIG. 23 showing channels of fluid communication.

The base curve middle plate 150 also contains a plurality of orifices 192 providing fluid communication between cavity 186 and middle plate bottom surface 184. In a preferred embodiment, there are eight orifices 192 which are arranged symmetrically. Orifices 192 preferably contain a nozzle 194, or other means to direct the flow of gas through orifice 192. FIG. 33. Annular extensions 196 which are in axial alignment with orifices 192 and which have an inner diameter approximately equal to the diameter of orifices 192 extend from the middle plate bottom surface 184.

Figure 31:
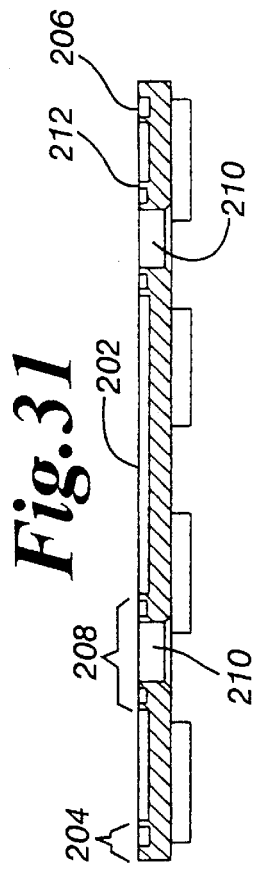
FIG. 31 is a cross-section of the base curve mold cleaning assembly bottom plate of FIG. 30 taken along line 31—31.
Figure 30:
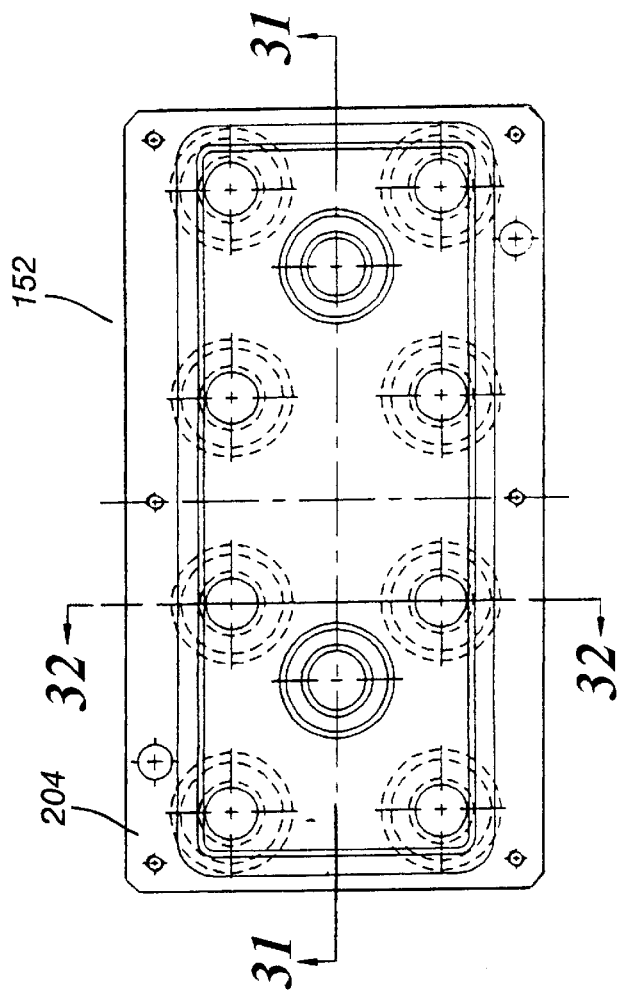
FIG. 30 is a top view of a base curve mold cleaning assembly bottom plate.
Figure 32:
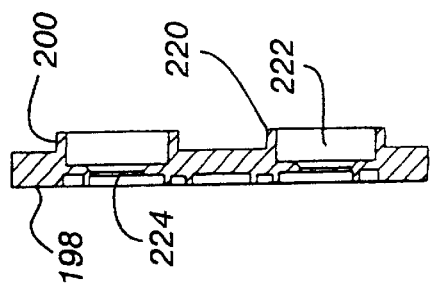
FIG. 32 is a cross-section of the base curve mold cleaning assembly bottom plate of FIG. 30 taken along line 32—32.

Referring now primarily to FIG. 30, FIG. 31, and FIG. 32, a base curve bottom plate 152 having a top surface 198 and a bottom surface 200 is attached to base curve middle plate 150. FIG. 23. The top surface 198 contains a recess 202 having an outer perimeter generally smaller than and symmetrical with the outer perimeter of the plate thereby creating an outer ridge 204. Outer ridge 204 contains a channel 206 which houses an o-ring. FIG. 24. Within recess 202 are two raised cylindrical portions 208 which house stabilizing slots 210 thereby creating cylindrical ridges 212. Ridges 212 contain channels 214, which house o-rings. FIG. 23. When base curve bottom plate 152 is attached to base curve middle plate 150, a cavity 216, as shown in FIG. 23 is created by recess 202, and middle plate bottom surface 184.

Base curve bottom plate bottom surface, 200, contains a plurality of raised cylindrical portions 218 having an inner diameter and an outer diameter thereby defining a cylindrical ridge 220 and the cylindrical wall of a recess 222 having a definite depth situated within cylindrical portion 218. Optionally, a sealing means, especially an elastomeric sealing means, e.g., o-ring, is attached to the cylindrical ridge 220. Cylindrical recess 222 extends upward into base curve bottom plate 152 to a point intermediate top surface 198 and bottom surface 200. In a preferred embodiment shown in FIG. 30, there are eight cylindrical portions 218 symmetrically arranged and in axial alignment with base curve middle plate orifices 192.

A second cylindrical recess 224 having a diameter smaller than the diameter of cylindrical recess 222 extends downward from the bottom of recess 202 and is axially aligned with cylindrical recess 222 and establishes fluid communication between recess 202 and cylindrical recess 222. Second cylindrical recess 224 is of sufficient diameter to allow middle plate annular extensions 196 to substantially occupy recess 222 thereby defining an annular space 226. Annular space 226 maintains fluid communication between cylindrical recess 222 and cavity 216.

Operation of the Base Curve Cleaning Assembly

In operation, base curve mold cleaning assemblies 26 and base curve lens mold carriers 18 are arranged so that cylindrical recesses 222 are in substantially axial with base curve carrier holes 52. The base curve cleaning assembly 26 is lowered by positioning means 82 to place ridge 218 close to the flange of the lens mold, e.g., approximately 1/15,000 of an inch above the base of the lens mold. FIG. 33. Alternatively, especially when the ridge 218 is equipped with sealing means, the base curve mold cleaning assembly 26 is lowered to place the sealing means of the ridge 218 on the flange of the lens mold, thereby pneumatically sealing the lens mold and the cylindrical recess 222. Two channels of fluid communication are created. The first channel consisting of hole 158, cavity 186, orifices 192 and annular extensions 196 allow compressed gas to flow at greater than atmospheric pressure from an outside source (not shown) into cylindrical recess 222 to dislodge any debris residing on the lens mold. Gases suitable for the invention include nitrogen, carbon dioxide and air. This flow of gas is shown schematically in FIG. 23 and FIG. 33.

The second channel of fluid communication is under the influence of a vacuum and is used to remove the gas and debris located around the lens mold. Beginning with recess 222, the gas and any debris present leave cylindrical recess 222 via annular space 226 and proceed through cavity 216 through middle plate hole 188 and out top plate vacuum hole 160 into a vacuum line (not shown). Again, gas injection and application of the vacuum can occur independently, simultaneously or sequentially and can be of variable duration. For example, the vacuum is applied first and then quickly the pressurized gas is applied to ensure that all the debris located on the lens mold and in the recess 222 is removed through the annular space 226.

Closing the Lens Mold Carriers

After the lens molds are cleaned, the lens molds proceed to a subsequent station to be filled with a polymerizable or crosslinkable lens formulation. The lens formulation is deposited on the concave surface of the front curve mold. After the molds are filled, the front curve mold carrier and the base curve mold carriers, which holds respective base curve molds, are mated and locked. The base curve molds can be manually removed from the base curve mold carrier and placed over the filled front curve molds on the front curve lens mold carrier. Then the base curve mold carrier is placed over the front curve lens mold carrier, and the locking bars are engaged to close and lock the lens mold carriers along with the engaged lens molds. Alternatively, an automated process can be used to close the lens mold carriers. For example, a vacuum-driven force is applied from the first section 54 (FIG. 4) of the base curve mold carrier to retain the back curve molds. While applying the holding force, the base curve mold carrier is inverted and placed directly over the front curve lens mold carrier, thereby directly placing the base curve molds over the filled front curve molds. The base curve mold carrier is lowered to engage it with the front curve mold carrier using the elongated stabilizing members 60 as a guide to engage the stabilizing holes 34, thereby precisely aligning and closing the two lens mold carriers. FIG. 7. Once the back curve lens mold carrier and the front curve lens mold carrier are closed, slight pressure is applied to depress the springs 48 (FIG. 3) and to properly align the engaged front and back lens molds in the carriers. The locking bars 35 are then slidably moved to lock the two lens mold carriers. The closed and locked lens mold carriers are then processed further, e.g., polymerization process, to produce finished lenses. The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to the invention are defined only by the following claims and reasonable extensions and equivalents thereof.

What is claimed is:

1. A carrier set for lens molds, said lens molds comprising a front curve mold and a matching back curve mold, said front and back curve molds form a void that defines the shape of a lens when the molds are closed, said carrier set comprising:

a) a front curve carrier, said front curve carrier having one or more of front curve holes, which holes are adapted to receive said front curve molds, b) a back curve carrier, said back curve carrier having one or more of back curve holes, which holes are adapted to receive said back curve molds, c) at least one spring in said front curve hole or said back curve hole, said spring providing a holding tension on said lens molds when said front and back curve carriers having said lens molds are closed, d) at least one stabilizing hole formed in one of said front curve carrier and said back curve carrier, e) at least one elongated stabilizing member attached to the other carrier without said stabilizing hole, and f) at least one locking bar in the carrier having said stabilizing hole, wherein said elongated stabilizing member is adapted to slidably engage with said stabilizing hole, wherein said locking bar slidably moves and is adapted to engage said elongated stabilizing member such that when said front and back carriers are closed and said elongated stabilizing member and said stabilizing hole are engaged, said locking bar is engaged with said elongated stabilizing member to securely lock said front curve carrier and said back curve carrier in a properly closed position.

2. The carrier set of claim 1 wherein said front curve carrier has said stabilizing hole and said locking bar.

3. The carrier set of claim 2 wherein said elongated stabilizing member has a notch, wherein said notch is adapted to receive said locking bar, thereby allowing said front curve carrier and said back curve carrier to lock in a closed position.

4. The carrier set of claim 1 wherein said front curve carrier has an alignment channel that aligns said front curve mold on said carrier.

5. The carrier set of claim 1 wherein said front curve carrier has said spring and a hollow piston that sits on said spring.

6. The carrier set of claim 3 wherein said locking bar has a locked position notch and an unlocked position notch.

7. The carrier set of claim 1, wherein said locking bar has a locked position notch and an unlocked position notch, and wherein the carrier having said locking bar has a spring-assisted ball pointer, which assists the movement of said locking bar from one of said locked position notch and said unlocked position notch to the other one, thereby providing precise open and closed positions of said locking bar.

8. A carrier set for lens molds, said lens molds comprising a front curve mold and a back curve mold, said front and back curve molds form a void that defines the shape of a lens when the molds are closed, said carrier set comprising:

a) a front curve carrier, said front curve carrier comprising one or more of front curve holes, each of said holes being adapted to receive one of said front curve molds, said front curve carrier further comprising a stabilizing hole and a locking bar;

b) a back curve carrier, said back curve carrier comprising one or more of back curve holes, each of said holes being adapted to receive one of said back curve molds, said back curve carrier further comprising an elongated stabilizing member, said elongated stabilizing member being adapted to tightly engage with said stabilizing hole, said elongated stabilizing member having a notch; and c) a spring, said spring providing a holding tension on said lens molds when said front and back curve molds are closed;

wherein said spring is placed in said front curve carrier or in said back curve carrier or in both carriers, and wherein said locking bar slidably moves and is adapted to engage said notch such that when said front and back carriers are closed and said elongated stabilizing member and said stabilizing hole are engaged, and wherein said locking bar is engaged with said notch to lock said front and back carriers in the closed position.

9. The carrier set of claim 8 wherein an alignment hole is formed next to said front curve hole such that said front curve mold properly aligns in said front curve hole.

10. The carrier set of claim 8 wherein said front curve carrier further comprises a hollow piston that is placed on said spring, wherein said hollow piston forms said front curve hole.

11. The carrier set of claim 8 wherein said locking bar has a locked position notch and an unlocked position notch.

12. The carrier set of claim 11 wherein said front curve carrier has a spring-assisted ball pointer, which assists the movement of said locking bar from one of said locked position notch and said unlocked position notch to the other one, thereby providing precise open and closed positions of said locking bar.

13. A carrier set for lens molds, said lens molds comprising a front curve mold and a matching back curve mold, said front and back curve molds forming a void that defines the shape of a lens when the molds are closed, said carrier comprising:

a) a back curve carrier, said back curve carrier comprising one or more of back curve holes, each of said holes being adapted to receive one of said back curve molds, said back curve carrier further comprising a stabilizing hole and a locking bar;

b) a front curve carrier, said front curve carrier comprising one or more of front curve holes, wherein each of said holes being adapted to receive one of said front curve molds, said front curve carrier further comprising an elongated stabilizing member, wherein said elongated stabilizing member is adapted to tightly engage with said stabilizing hole, said elongated stabilizing member having a receiving means for said locking bar; and c) a spring, said spring providing a holding tension on said lens molds when said front and back curve molds are closed;

wherein said spring is placed in said front curve carrier or in said back curve carrier or in both carriers, and wherein said locking bar slidably moves and is adapted to tightly engage said receiving means such that when said front and back carriers are closed and said elongated stabilizing member and said stabilizing hole are engaged, said locking bar is engaged with said receiving means to securely lock said front and back carriers in the closed position.

14. The carrier set of claim 13 wherein an alignment hole is formed next to said back curve hole such that said back curve mold properly aligns in said back curve hole.

15. The carrier set of claim 13 wherein said back curve carrier further comprises a hollow piston that is placed on said spring, wherein said hollow piston forms said back curve hole.

16. The carrier set of claim 13 wherein said locking bar has a locked position notch and an unlocked position notch.

17. The carrier set of claim 16 wherein said back curve carrier has a spring-assisted ball pointer, which assists the movement of said locking bar from one of said locked position notch and said unlocked position notch to the other one, thereby providing precise open and closed positions of said locking bar.

* * * * *